(12) United States Patent
Lee

(10) Patent No.: US 9,095,238 B2
(45) Date of Patent: Aug. 4, 2015

(54) CONTAINER FOR A FOOD MIXER

(71) Applicant: Wen Ching Lee, Taichung (TW)

(72) Inventor: Wen Ching Lee, Taichung (TW)

(*) Notice: Subject to any disclaimer, the term of this patent is extended or adjusted under 35 U.S.C. 154(b) by 229 days.

(21) Appl. No.: 13/625,112

(22) Filed: Sep. 24, 2012

(65) Prior Publication Data

US 2014/0084094 A1 Mar. 27, 2014

(51) Int. Cl.
*B02C 18/22* (2006.01)
*A47J 43/046* (2006.01)
*A47J 43/07* (2006.01)

(52) U.S. Cl.
CPC ............ *A47J 43/046* (2013.01); *A47J 43/0716* (2013.01); *A47J 43/0722* (2013.01)

(58) Field of Classification Search
CPC ...... B02C 17/02; B02C 17/04; B02C 18/302; B02C 18/12; B02C 18/20; A47J 43/16; A47J 43/255; A47J 43/046; A47J 43/0722; A47J 43/07; A47J 43/0716; B26D 1/29
USPC .................... 241/91, 92, 278.1, 282.1, 282.2; 99/510, 513; 366/199, 205, 314
See application file for complete search history.

(56) References Cited

U.S. PATENT DOCUMENTS

| | | | | |
|---|---|---|---|---|
| 2,726,071 | A * | 12/1955 | Bernhardt | 366/256 |
| 2,761,659 | A * | 9/1956 | Collura | 241/282.2 |
| 3,892,365 | A * | 7/1975 | Verdun | 241/92 |
| 4,228,963 | A * | 10/1980 | Yamauchi et al. | 241/92 |
| 5,297,475 | A * | 3/1994 | Borger et al. | 99/348 |
| 6,814,323 | B2 * | 11/2004 | Starr et al. | 241/282.2 |
| 7,520,659 | B2 * | 4/2009 | Wulf et al. | 366/198 |
| 2008/0219089 | A1 * | 9/2008 | Sandford et al. | 366/197 |

* cited by examiner

*Primary Examiner* — Faye Francis
*Assistant Examiner* — Onekki Jolly
(74) *Attorney, Agent, or Firm* — Rosenberg, Klein & Lee

(57) ABSTRACT

A base for a food mixer includes a container body having a bottom wall. A blade unit is mounted in the container body and includes a blade unit body and a coupling member. A seat made of metal is mounted to an outer side of the bottom wall of the container body. The seat includes an underside having a first recess. A weight is mounted to the underside of the seat. A cushioning pad is sandwiched between the weight and the seat. The coupling member extends beyond the underside of the seat or an underside of the weight. The coupling member connects with a shaft of a power unit.

7 Claims, 4 Drawing Sheets

CONTAINER FOR A FOOD MIXER

BACKGROUND OF THE INVENTION

The present invention relates to a container and, more particularly, to a container for a food mixer.

Food materials, such as vegetables and fruits, can be placed into a container of a food mixer, and a blade unit is driven by a power unit in a base of the food mixer to mince the food material into a paste to obtain juice. Liquid or flavoring can be added into the juice for drinking or eating purposes.

To allow easy carriage by a user, the container is generally made of plastic to reduce the overall weight of the container. However, a bottom wall of the container is liable to deform or deteriorate by high heat resulting from high-speed rotation of the blade unit, causing leakage of the juice. Furthermore, the overall weight of the food mixer is light and without any vibration-absorbing device, such that the user has to press a top of the container downward during operation to avoid falling of the container from the base due to vibration generated during operation of the power unit and the blade unit, resulting in inconvenient use.

BRIEF SUMMARY OF THE INVENTION

To overcome the disadvantages of the prior art, the present invention provides a base for a food mixer. The base includes a container body having a bottom wall. A blade unit is mounted in the container body and includes a blade unit body and a coupling member. A seat made of metal is mounted to an outer side of the bottom wall of the container body. The seat includes an underside having a first recess. A weight is mounted to the underside of the seat. A cushioning pad is sandwiched between the weight and the seat. The coupling member extends beyond the underside of the seat or an underside of the weight. The coupling member is adapted to connect with a shaft of a power unit.

Preferably, the seat includes a top side having a second recess. A lower half portion of the container body is partially received in the second recess. A first waterproof gasket is mounted to an edge of an opening of the second recess.

Preferably, a second waterproof gasket is mounted in an interconnection between the blade unit body and the seat.

Preferably, a connecting frame is mounted to the underside of the seat. The connecting frame includes an underside having a tab.

Preferably, the connecting frame includes an opening having an inner periphery. The weight faces the opening of the connecting frame. The inner periphery of the opening of the connecting frame has a toothed portion. The weight has a tooth on the underside thereof. The tooth is engaged with the toothed portion.

Preferably, the weight includes a top side having an annular groove. The cushioning pad is annular and received in the annular groove.

Preferably, the container body is made of a light-transmittable material and includes a scale on an outer periphery thereof.

The present invention will become clearer in light of the following detailed description of illustrative embodiments of this invention described in connection with the drawings.

DETAILED DESCRIPTION OF THE INVENTION

Figure 1:
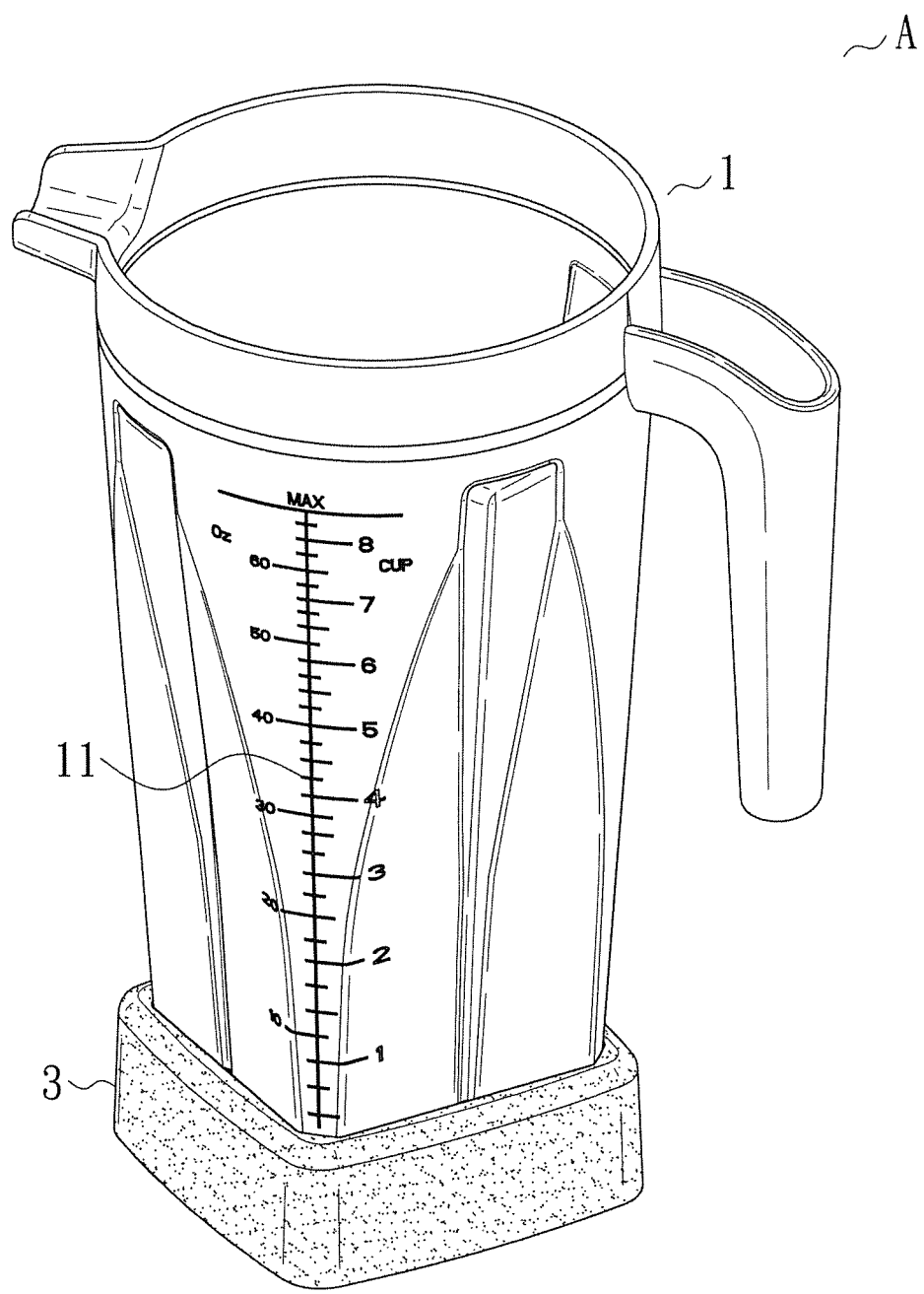
FIG. 1 shows a perspective view of a food mixer according to the present invention.
Figure 2:
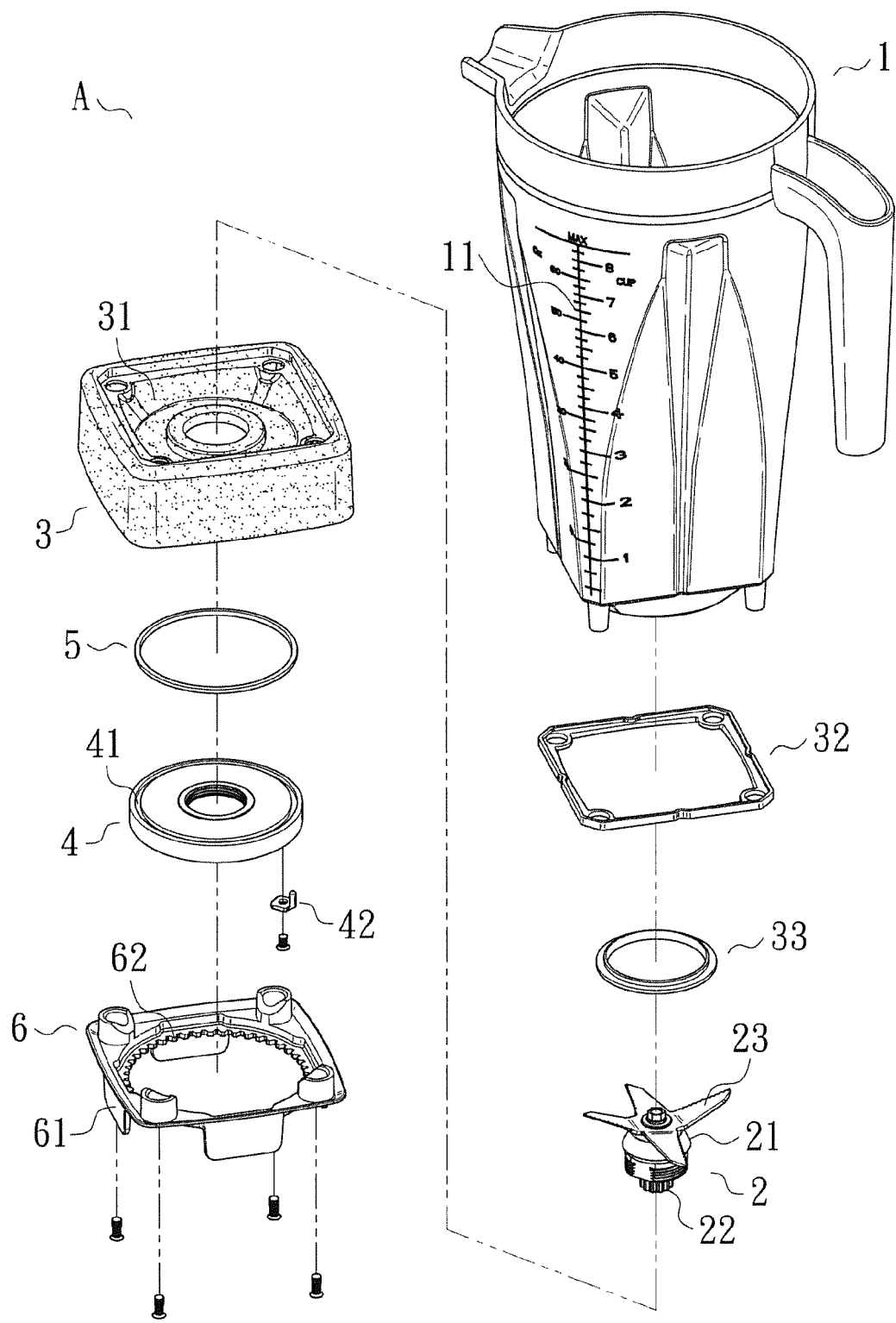
FIG. 2 shows an exploded, perspective view of the food mixer of FIG. 1.
Figure 3:
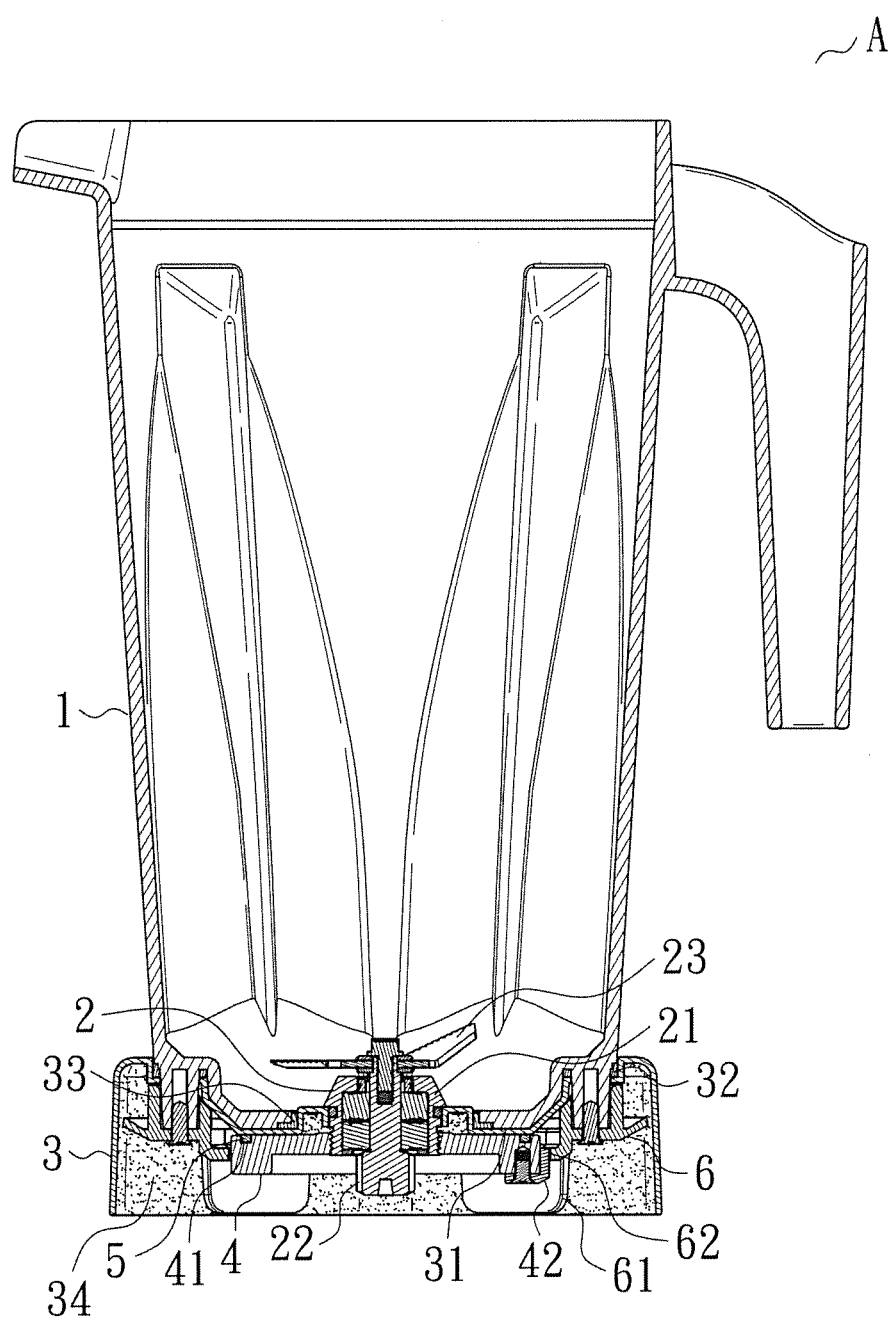
FIG. 3 shows a cross sectional view of the food mixer of FIG. 1.

With reference to FIG. 1, a food mixer according to the present invention includes a container A having a container body 1. With reference to FIGS. 2 and 3, the container body 1 is made of a light-transmittable material and includes a scale 11 on an outer periphery thereof, allowing a user to see the level of juice in the container body 1.

A blade unit 2 is mounted in the container body 1 and located at an inner side of a bottom wall of the container body 1. The blade unit 2 includes a blade unit body 21 and a coupling member 22 at a bottom of the blade unit body 21. The coupling member 22 is adapted to connect with a shaft of a power unit mounted to a base of the food mixer for driving blades 23 on top of the blade unit 21.

With reference to FIGS. 2 and 3, a seat 3 made of metal is mounted to an outer side of the bottom wall of the container body 1. The seat 3 includes an underside having a first recess 34. A weight 4 is mounted to the underside of the seat 3 to increase an overall weight of the container A. Thus, a user does not have to press the container A downward during use, avoiding the disadvantage of the prior art. A cushioning pad 5 is sandwiched between the weight 4 and the seat 3. The cushioning pad 5 avoids the container A from being damaged by the rotational energy provided by the power unit for driving the blade unit 2. The weight 4 includes a top side having an annular groove 41. The cushioning pad 5 is annular and received in the annular groove 41. Thus, the cushioning pad 5 can be reliably received between the weight 4 and the seat 3.

The seat 3 further includes a top side having a second recess 31. A lower half portion of the container body 1 is partially received in the second recess 31, providing reliable connection. Furthermore, a first waterproof gasket 32 is mounted to an edge of an opening of the second recess 31, avoiding external fluid from flowing into the second recess 31.

The coupling member 22 extends beyond the underside of the seat 3 or an underside of the weight 4. In the form shown, the coupling member 22 extends beyond the underside of the weight 4 and is coupled to the shaft of the power unit for joint rotation purposes. A second waterproof gasket 33 is mounted in an interconnection between the blade unit body 21 and the seat 3, avoiding fluid from flowing into the second recess 31.

Figure 4:
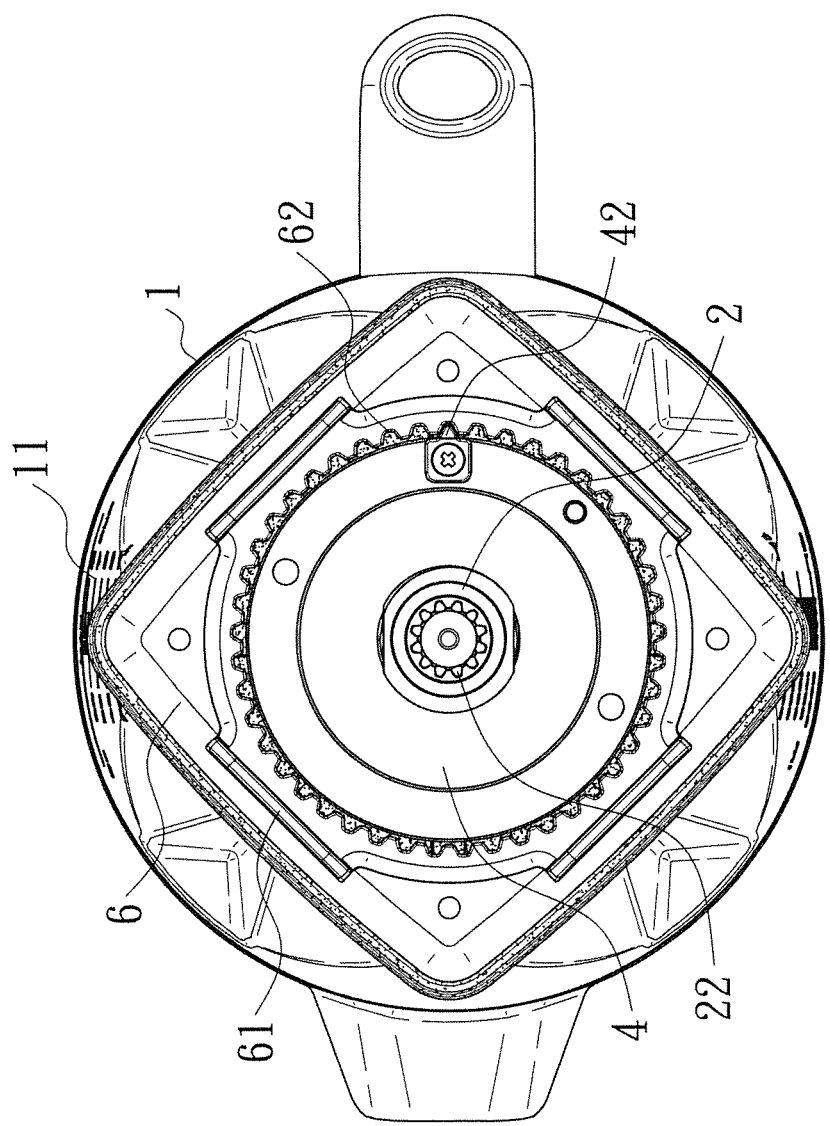
FIG. 4 shows a bottom view of the food mixer of FIG. 1.

With reference to FIGS. 2 and 4, a connecting frame 6 is mounted to the underside of the seat 3 and received in the first recess 34. The connecting frame 6 includes an underside having a tab 61. When the container A is placed on top of the base of the food mixer, the tab 61 engages with a safety device in the base of the food mixer to allow operation of the base of the food mixer. Furthermore, the connecting frame 6 includes an opening having an inner periphery with a toothed portion 62. The weight 4 faces the opening of the connecting frame 6 and has a tooth 42 on the underside thereof. The tooth 42 is engaged with the toothed portion 62, providing reliable engagement between the seat 3, the weight 4, and the connecting frame 6.

Although specific embodiments have been illustrated and described, numerous modifications and variations are still possible without departing from the essence of the invention. The scope of the invention is limited by the accompanying claims.

The invention claimed is:

1. A food processor comprising:
   a power unit having a shaft member;
   a container body including a bottom wall having a coupling member for securing a blade unit mounted therein, wherein the coupling member connects to and drives the shaft member of the power unit, the power unit detachably coupled to the bottom wall of the container body; and
   a seat made of metal coupled to an outer side of the bottom wall of the container body, the seat including an underside having a recess accommodating a weight member coupled to the underside of the seat, a cushioning pad sandwiched between the weight member and the seat.

2. The food processor as claimed in claim 1, wherein the seat includes a top side having a second recess, a lower half portion of the container body being partially received in the second recess, and a first waterproof gasket mounted to an edge of an opening of the second recess.

3. The food processor as claimed in claim 1, further comprising: a second waterproof gasket mounted in an interconnection between the blade unit and the seat.

4. The food processor as claimed in claim 1, further comprising: a connecting frame mounted to the underside of the seat, and the connecting frame including an underside having a tab.

5. The food processor as claimed in claim 4, wherein the connecting frame includes an opening having an inner periphery, the inner periphery of the opening of the connecting frame having a toothed portion matingly engaged with a toothed portion of the weight member on the underside thereof.

6. The food processor as claimed in claim 1, wherein the weight member includes a top side having an annular groove, and the cushioning pad being annular and received in the annular groove.

7. The food processor as claimed in claim 1, wherein the container body is made of a light-transmittable material, and the container body includes a scale on an outer periphery thereof.

* * * * *